(12) United States Patent
Whitaker

(10) Patent No.: US 12,486,627 B2
(45) Date of Patent: Dec. 2, 2025

(54) ROAD MARKING SYSTEM AND METHOD OF USE

(71) Applicant: Dusty Whitaker, Childress, TX (US)

(72) Inventor: Dusty Whitaker, Childress, TX (US)

( * ) Notice: Subject to any disclaimer, the term of this patent is extended or adjusted under 35 U.S.C. 154(b) by 682 days.

(21) Appl. No.: 17/685,840

(22) Filed: Mar. 3, 2022

(65) Prior Publication Data
US 2023/0279622 A1 Sep. 7, 2023

(51) Int. Cl.
*B05C 5/00* (2006.01)
*E01C 23/22* (2006.01)
*E01F 9/518* (2016.01)

(52) U.S. Cl.
CPC .............. *E01C 23/222* (2013.01); *B05C 5/00* (2013.01); *E01F 9/518* (2016.02)

(58) Field of Classification Search
USPC .................................................. 118/323, 321
See application file for complete search history.

(56) References Cited

U.S. PATENT DOCUMENTS

| | | | | |
|---|---|---|---|---|
| 2,065,998 A | * | 12/1936 | Emmons | E01C 23/222 239/150 |
| 2,192,433 A | * | 3/1940 | Cornelison | E01C 23/222 74/32 |
| 2001/0024596 A1 | | 9/2001 | Sanfilippo | |

FOREIGN PATENT DOCUMENTS

EP 2152973 B1 2/2010

* cited by examiner

*Primary Examiner* — Yewebdar T Tadesse
(74) *Attorney, Agent, or Firm* — Shannon Warren

(57) ABSTRACT

A road marker system for dispensing a plurality of markings at a uniform distance on a road. wherein the road marker system comprises a frame. wherein, the frame is configured to attach a spraying assembly to a vehicle and position the spraying assembly at a visible distance from a vehicle driver. A chain assembly comprises a plurality of sprocket wheels with a chain wrapped circulating around the plurality of sprocket wheels. A circulating striker assembly is attached to an exterior portion of the chain. wherein, the circulating striker assembly is configured to circulate around the chain as the chain circulates around the plurality of sprocket wheels. The road marker system further comprises a valve nozzle release having a paint bottle.

21 Claims, 15 Drawing Sheets

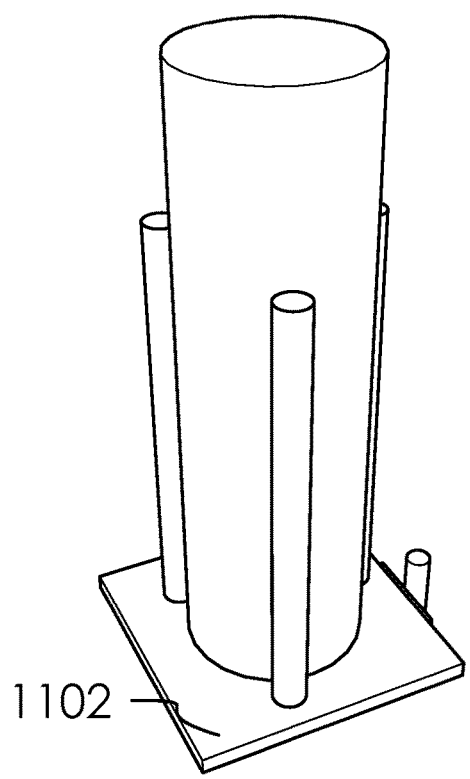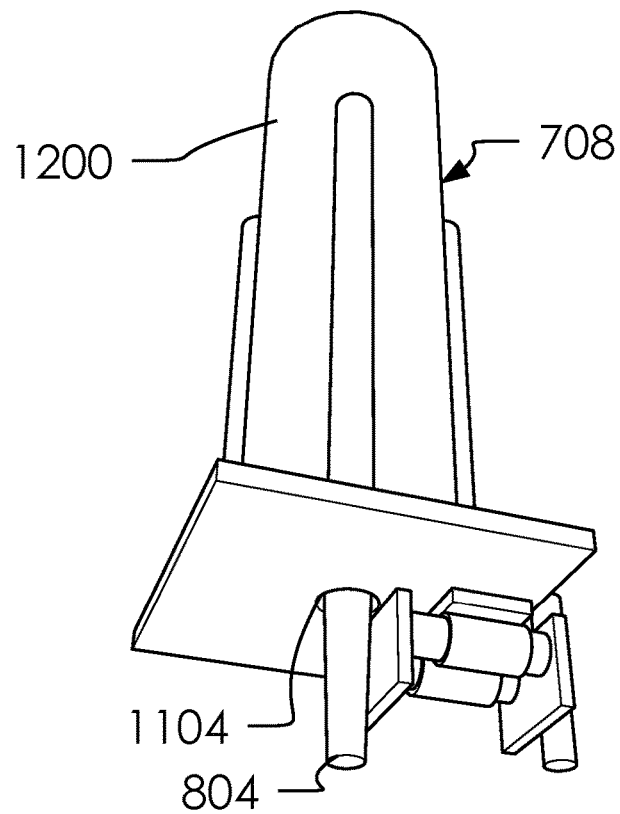
FIG. 12A    FIG. 12B
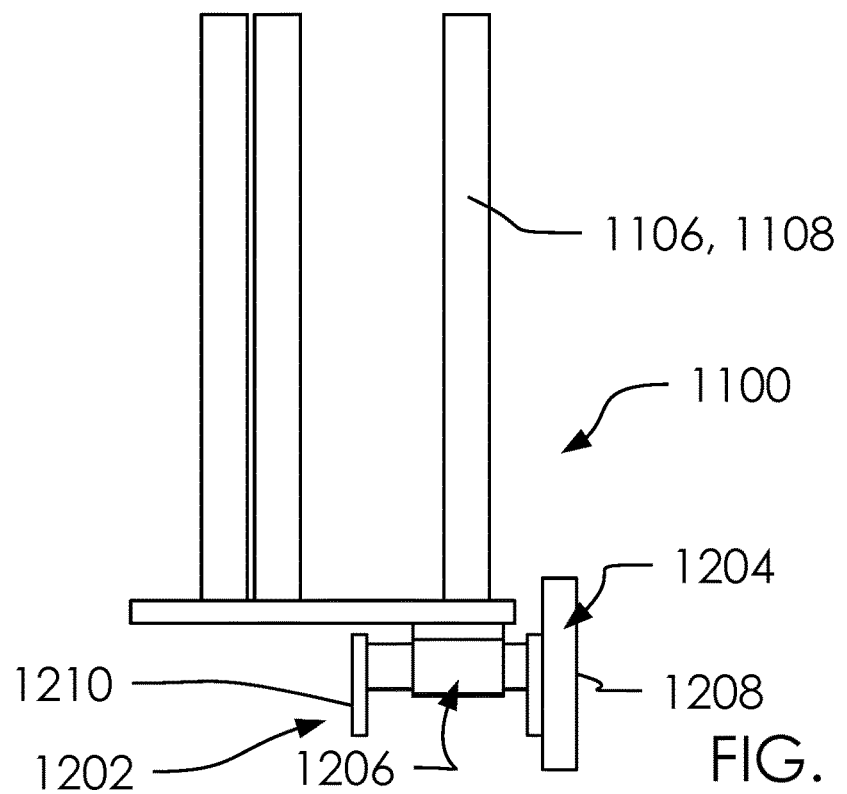
FIG. 12C

ROAD MARKING SYSTEM AND METHOD OF USE

CROSS-REFERENCE TO RELATED APPLICATIONS

Not applicable.

STATEMENT REGARDING FEDERALLY SPONSORED RESEARCH OR DEVELOPMENT (IF APPLICABLE)

Not applicable.

REFERENCE TO SEQUENCE LISTING, A TABLE, OR A COMPUTER PROGRAM LISTING COMPACT DISC APPENDIX (IF APPLICABLE)

Not applicable.

BACKGROUND OF THE INVENTION

Road marking systems are commonly used to apply a plurality of markings 106 to a road 102 during the construction and improvement of our road systems. Construction regulations may call for a periodic application of a road reflector to ensure safety and consistency on our national and state roadways.

The challenge of consistently marking the roads is a time consuming project. Commonly, a workman will be given a paint bottle and a rolling measuring wheel, and told to pace up and down a shoulder portion 204 of said road 102 and manually apply said plurality of markings 106. This approach has the limitation of the quality of labour and the likelihood of the workman's full attention on the job.

Two example of marking systems can be found in EP2152973B1 and US20010024596A1. Although neither foresee the current system nor render it obvious, these examples demonstrate the state of the art.

First, EP'973 discloses a system which is managed by an integrated circuit and software for the marking of roads. This is a very different approach than the one employed by the current system and would fail for lake of accuracy and reliability of sensors in application.

Next, US'596 discloses a rotating wheel and switch system that are adapted to applying rumble strips on a road with the added complexity of including periodic "ribs" (part 32). This system lacks the innovations of the currently claimed invention as discussed below.

BRIEF SUMMARY OF THE INVENTION

A road marker system for dispensing a plurality of markings at a uniform distance on a road. wherein said road marker system comprises a frame. Wherein, said frame is configured to attach a spraying assembly to a vehicle and position said spraying assembly at a visible distance from a vehicle driver. A chain assembly comprises a plurality of sprocket wheels with a chain wrapped circulating around said plurality of sprocket wheels. A circulating striker assembly is attached to an exterior portion of said chain. wherein, said circulating striker assembly is configured to circulate around said chain as said chain circulates around said plurality of sprocket wheels. Said road marker system further comprises a valve nozzle release having a paint bottle. Said paint bottle of said valve nozzle release is placed in the path of said circulating striker assembly such that, as said circulating striker assembly passes said paint bottle, said valve nozzle release is depressed and paint is released from said paint bottle. Said paint bottle is held in a paint bottle assembly inverted with said valve nozzle release pointed at a portion of said road. Said road marker system is configured to dispense a portion of said paint bottle by: driving a first sprocket wheel by rolling a wheel assembly on said road, spinning said wheel assembly, driving said first sprocket wheel, circulating said chain around said plurality of sprocket wheels, and triggering said valve nozzle release with said circulating striker assembly.

Said road marker system for dispensing said plurality of markings at said uniform distance on said road. wherein said road marker system comprises said frame, and said spraying assembly. Said spraying assembly comprises said chain assembly, and said paint bottle. Said chain assembly is configured to circulate and trigger said paint bottle to dispense paint at said uniform distance. Said frame is configured to attach said spraying assembly to said vehicle and position said spraying assembly at said visible distance from said vehicle driver.

Said road marker system for dispensing said plurality of markings at said uniform distance on said road. wherein said road marker system comprises said frame, and said spraying assembly. Said spraying assembly comprises said chain assembly, and said paint bottle. Said chain assembly is configured to circulate and trigger said paint bottle to dispense paint at said uniform distance. Said frame is configured to attach said spraying assembly to said vehicle and position said spraying assembly at said visible distance from said vehicle driver. Said road marker system is configured for allowing said spraying assembly to rotate left and right relative to a direction of travel by rotateably attaching said spraying assembly to said frame at a vertical axis.

BRIEF DESCRIPTION OF THE SEVERAL VIEWS OF THE DRAWING

FIG. 3 illustrates a perspective overview and detailed view of a hitch receiver 300.

FIG. 4 illustrates a perspective overview of a first bracket assembly 400.

FIG. 5 illustrates a perspective overview and two detailed views of an intermediate bracket assembly 500.

FIG. 6 illustrates a perspective overview of said road marker system 100 and a detailed view of a vertical axis 512.

FIGS. 12A, 12B, and 12C illustrate a perspective overview and lower view, and an elevated side view of said paint bottle assembly 1100.

DETAILED DESCRIPTION OF THE INVENTION

The following description is presented to enable any person skilled in the art to make and use the invention as claimed and is provided in the context of the particular examples discussed below, variations of which will be readily apparent to those skilled in the art. In the interest of clarity, not all features of an actual implementation are described in this specification. It will be appreciated that in the development of any such actual implementation (as in any development project), design decisions must be made to achieve the designers' specific goals (e.g., compliance with system- and business-related constraints), and that these goals will vary from one implementation to another. It will also be appreciated that such development effort might be complex and time-consuming, but would nevertheless be a routine undertaking for those of ordinary skill in the field of the appropriate art having the benefit of this disclosure. Accordingly, the claims appended hereto are not intended to be limited by the disclosed embodiments, but are to be accorded their widest scope consistent with the principles and features disclosed herein.

Figure 1:
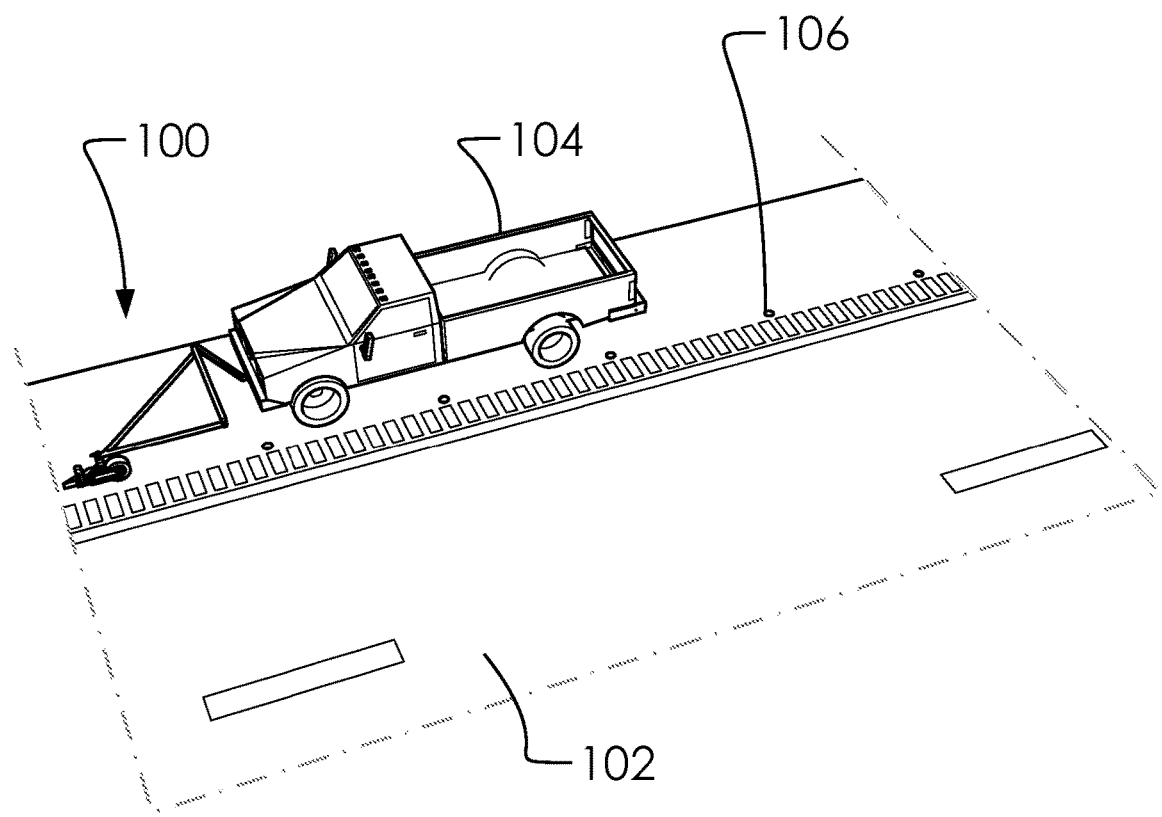
FIG. 1 illustrates a perspective overview of a road marker system 100 in use.

FIG. 1 illustrates a perspective overview of a road marker system 100 in use.

In one embodiment, said road marker system 100 can be used on a portion of a road 102, and attached to a vehicle 104. In one embodiment, said road marker system 100 can be used to place a plurality of markings 106 on said road 102.

Figure 2:
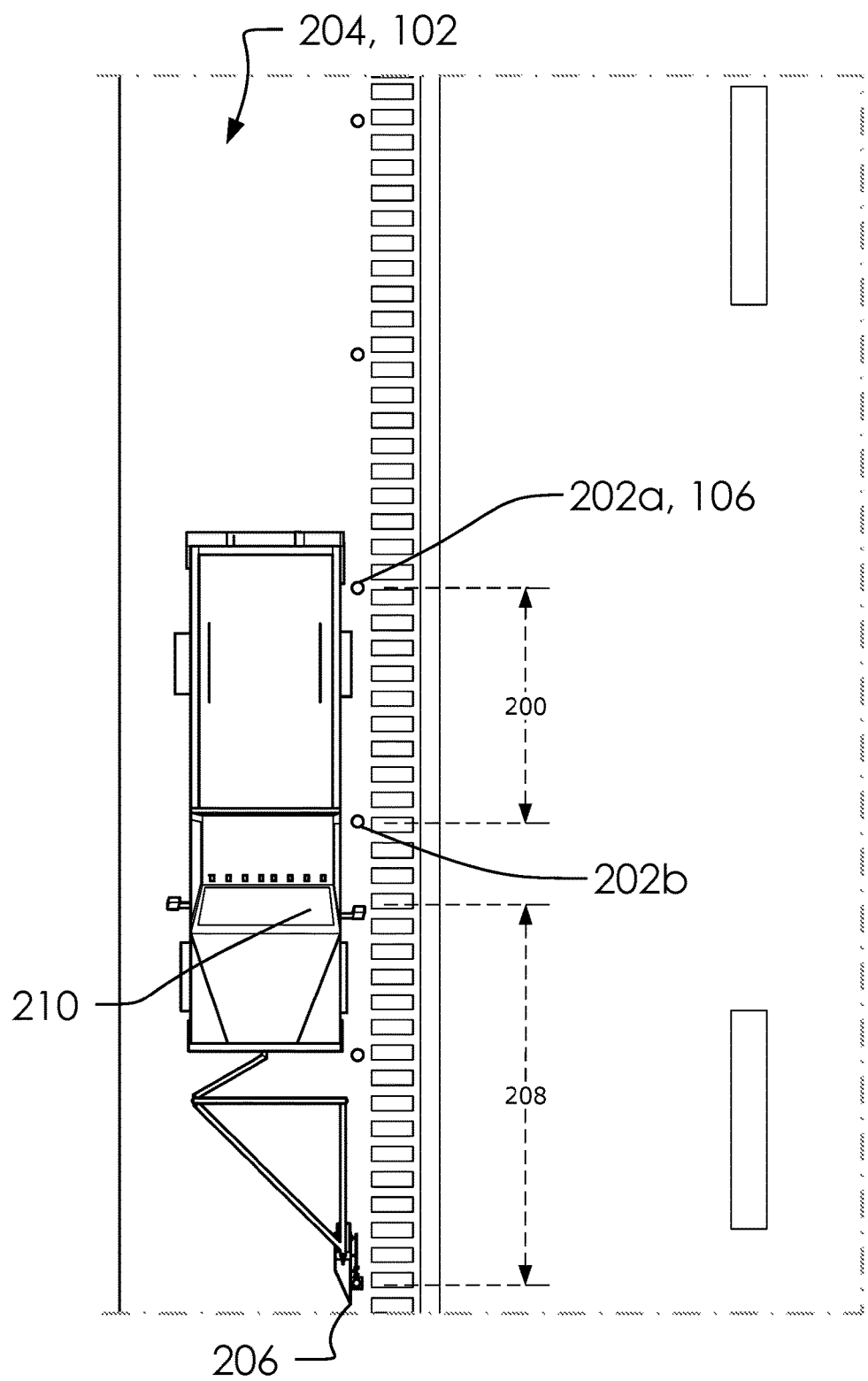
FIG. 2 illustrates an elevated top view of said road marker system 100 attached to a vehicle 104.

FIG. 2 illustrates an elevated top view of said road marker system 100 attached to said vehicle 104.

In one embodiment, said plurality of markings 106 can be separated by a uniform distance 200. For example, said plurality of markings 106 can comprise a first marker 202a and a second marker 202b.

In one embodiment, said road marker system 100 can be used to place said plurality of markings 106 on a shoulder portion 204 of said road 102.

In one embodiment, said road marker system 100 can comprise a distal end 206 being a visible distance 208 from a vehicle driver 210.

In one embodiment, said uniform distance 200 can comprise 20 feet, although as discussed below, said road marker system 100 can be configured to alter said uniform distance 200. In one scenario, construction standards require a road reflector to be placed on open roads every 40 feet. Wherein, an installer will be instructed to only install the reflector at every other marker among said plurality of markings 106.

FIGS. 3-6 illustrate a perspective overview of various parts of said road marker system 100, as discussed herein.

In one embodiment, said road marker system 100 can comprise a hitch receiver 300 attached to a portion of said vehicle 104.

Figure 3:
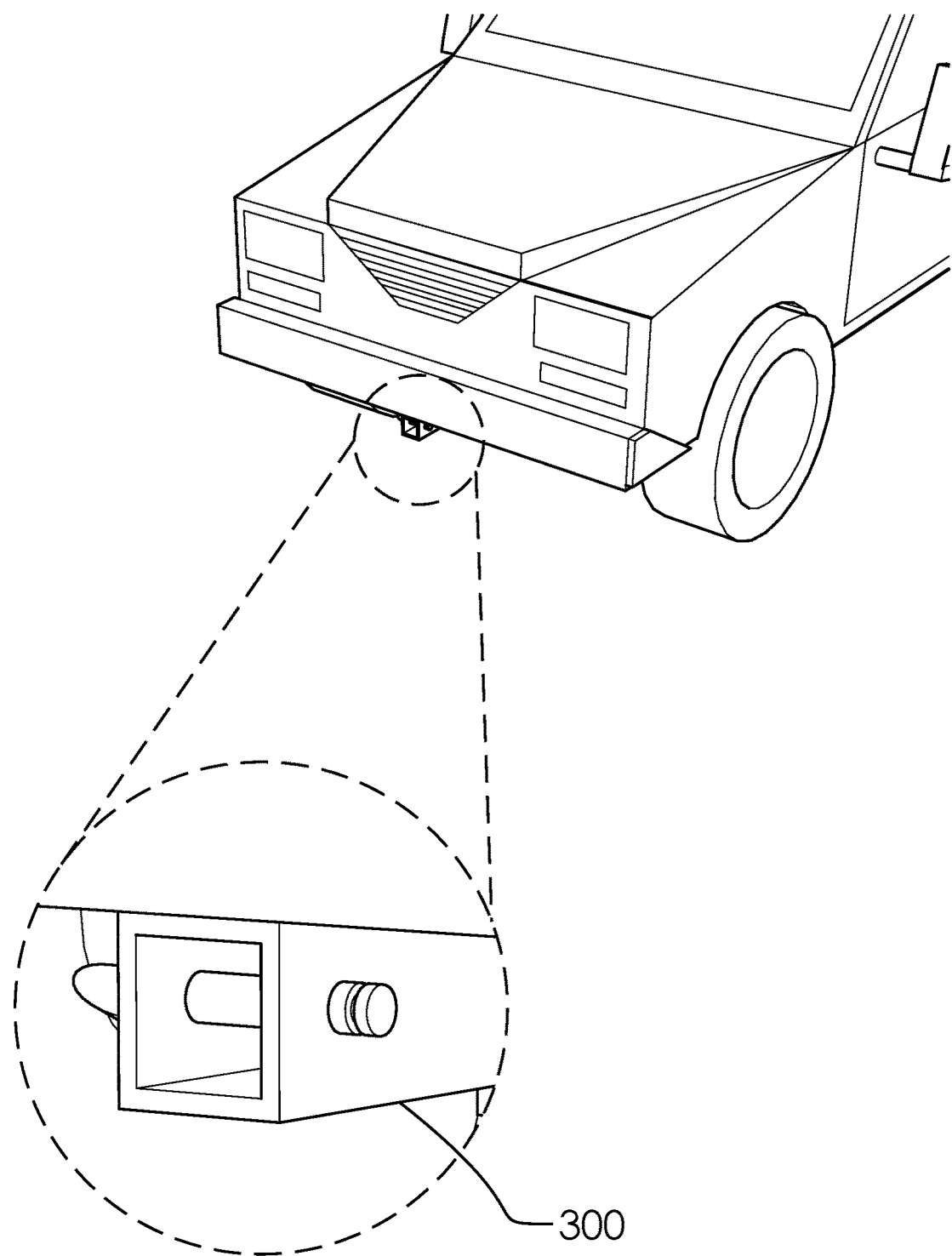
FIGS. 3-6 illustrate a perspective overview of various parts of said road marker system 100, as discussed herein.

FIG. 3 illustrates a perspective overview and detailed view of said hitch receiver 300.

Figure 4:
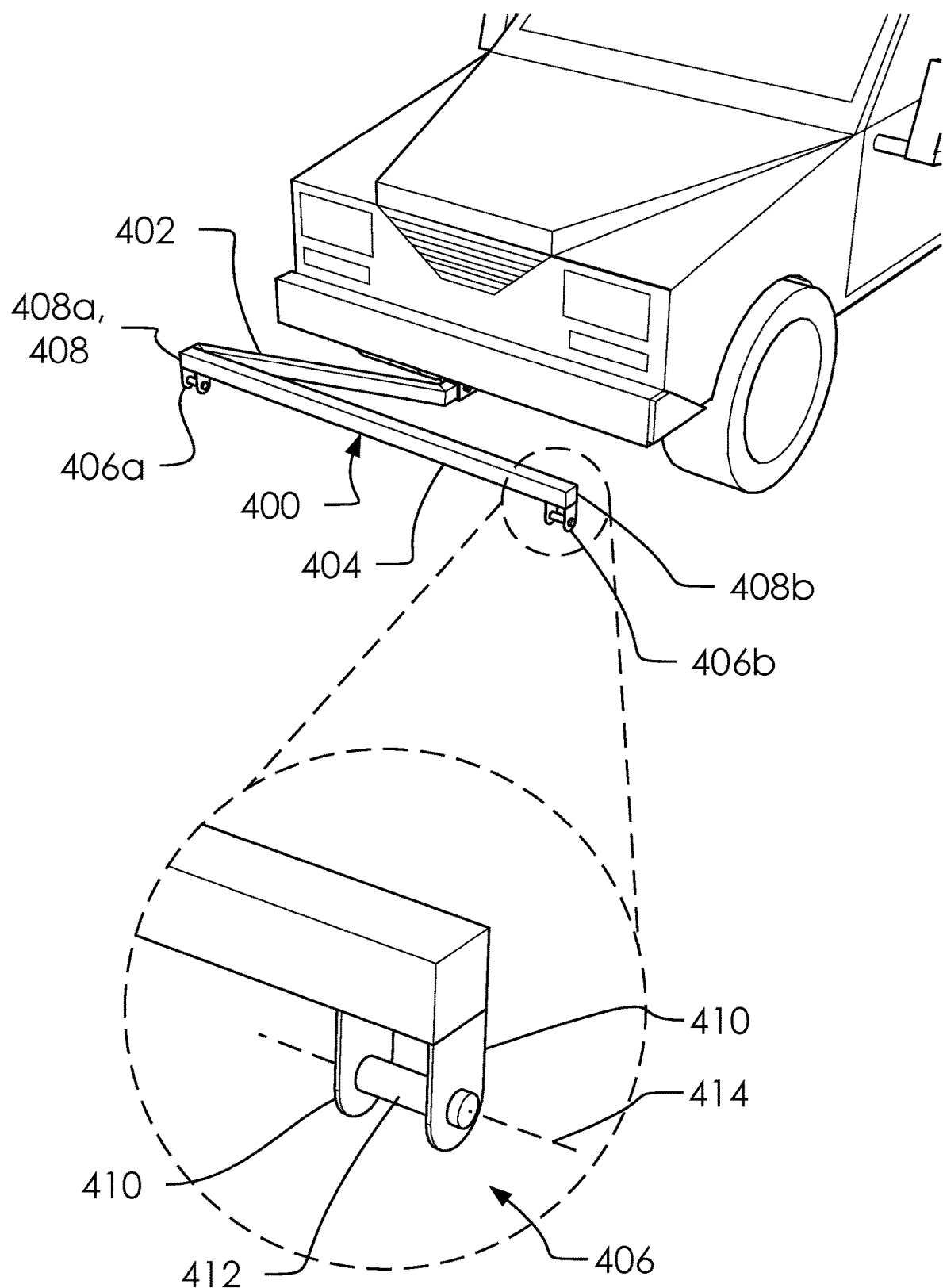

FIG. 4 illustrates a perspective overview of a first bracket assembly 400.

In one embodiment, said first bracket assembly 400 can comprise a receiver connector bar 402 and a cross bar 404. In one embodiment, said receiver connector bar 402 can selectively attach to said hitch receiver 300.

In one embodiment, said cross bar 404 can attach to said receiver connector bar 402. Said cross bar 404 can stretch across a front portion of said vehicle 104 being substantially parallel with a front bumper of said vehicle 104. Said cross bar 404 can comprise a first end 406a and a second end 406b.

In one embodiment, said first bracket assembly 400 can comprise one or more hinge assemblies 408 (which can comprise a first hinge assembly 408a, and a second hinge assembly 408b). In one embodiment, each among said one or more hinge assemblies 408 can comprise two side plates 410, and a hinge bar 412 aligned with a first rotating axis 414.

Figure 5:
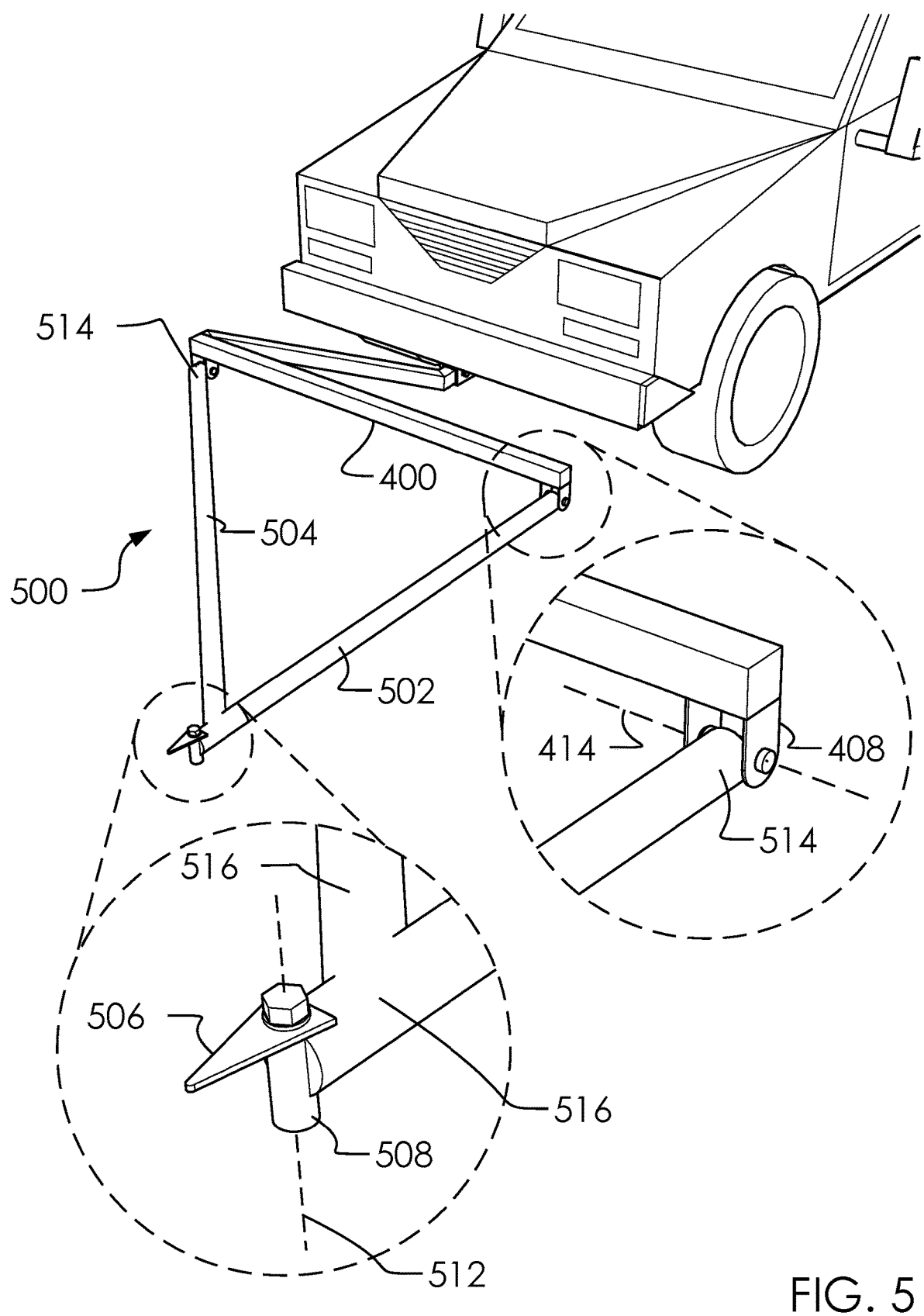

FIG. 5 illustrates a perspective overview and two detailed views of an intermediate bracket assembly 500.

In one embodiment, said intermediate bracket assembly 500 can comprise a first intermediate bar 502, a second intermediate bar 504, a pointer 506, a vertical sleeve 508, and a vertical fastener 510. In one embodiment, said vertical sleeve 508 can comprise a vertical axis 512.

In one embodiment, each among said first intermediate bar 502 and said second intermediate bar 504, can comprise a first end 514 and a second end 516. Wherein, said first end 514 of each said first intermediate bar 502 and said second intermediate bar 504 can rotateably attach to said one or more hinge assemblies 408 and rotate around said first rotating axis 414.

Said intermediate bracket assembly 500 can comprise a triangle formed by said first intermediate bar 502, said second intermediate bar 504 and said first bracket assembly 400. Said second end 516 of said first intermediate bar 502 and said second intermediate bar 504 can be attached to one another.

Said pointer 506 and said vertical sleeve 508 can be substantially aligned with said first intermediate bar 502. Said vertical sleeve 508 can be attached to said second end 516 of said first intermediate bar 502.

Figure 6:
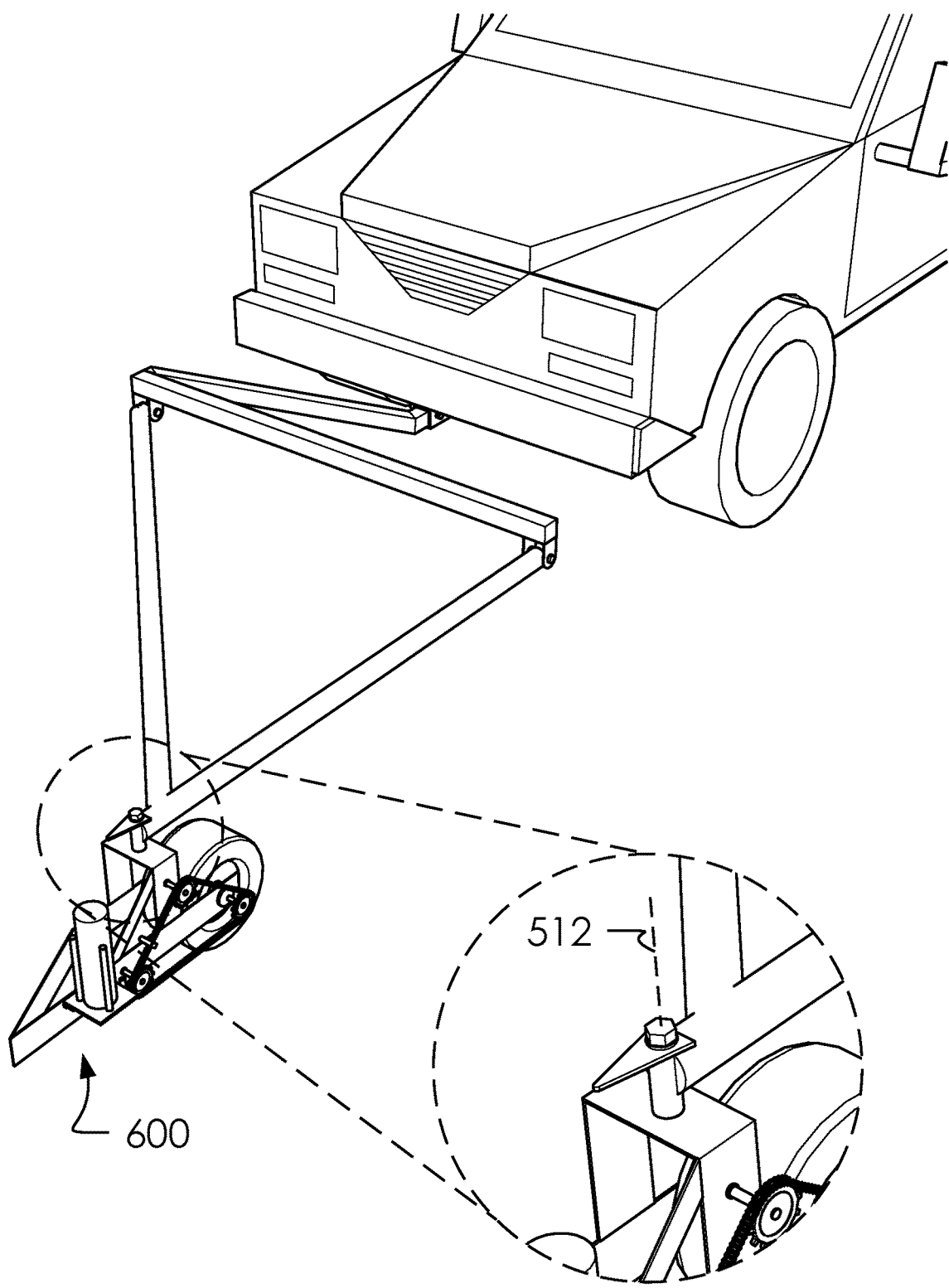

FIG. 6 illustrates a perspective overview of said road marker system 100 and a detailed view of said vertical axis 512.

In one embodiment, said road marker system 100 can comprise a spraying assembly 600 which can rotateably attach to said intermediate bracket assembly 500 and selectively rotate about said vertical axis 512.

Figure 7:
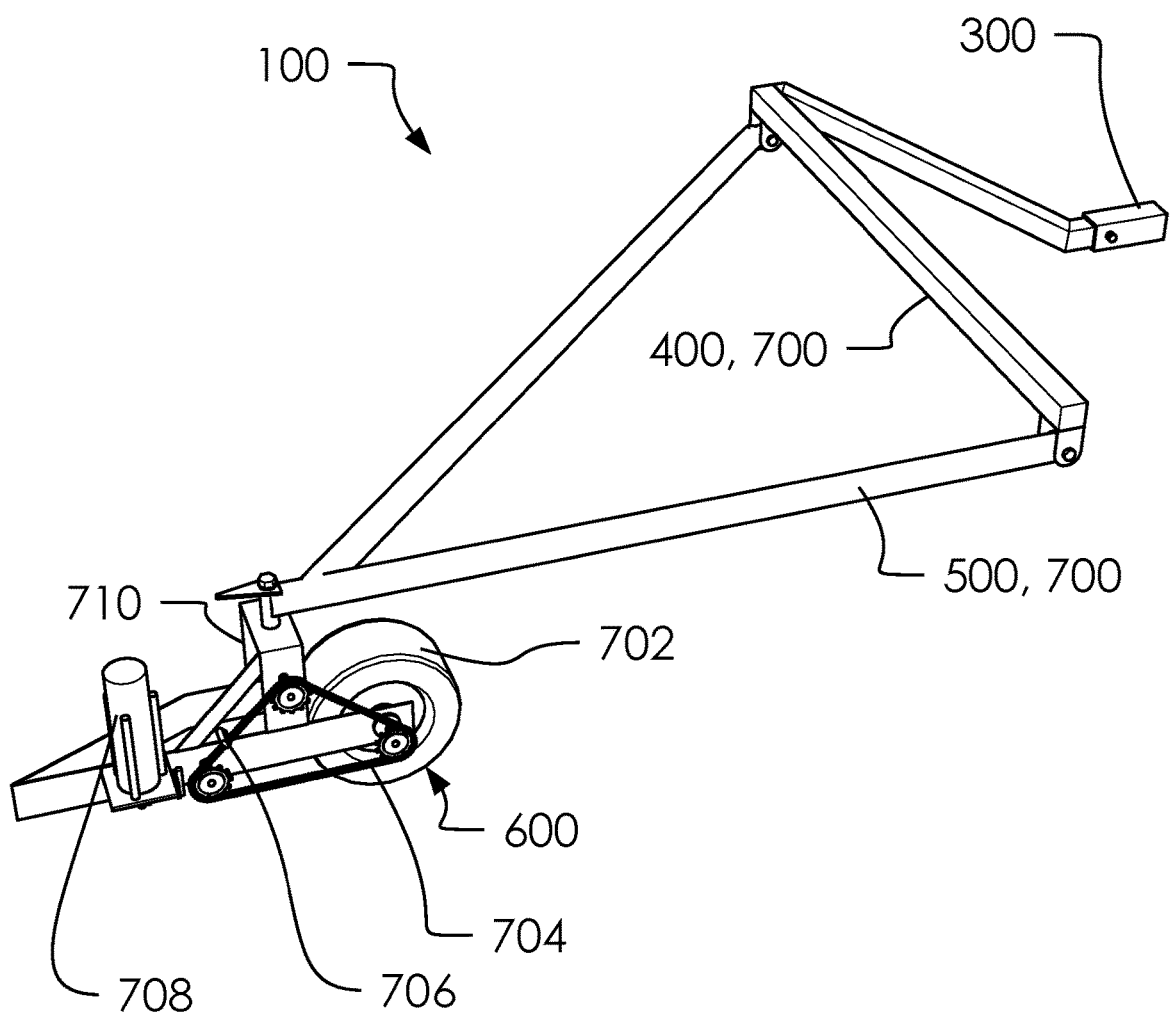
FIG. 7 illustrates a perspective overview of said road marker system 100.

FIG. 7 illustrates a perspective overview of said road marker system 100.

In one embodiment, said road marker system 100 can comprise a frame 700, which can comprise said first bracket assembly 400 and said intermediate bracket assembly 500. Wherein, said frame 700 can be configured to attach said spraying assembly 600 to said vehicle 104 and position said spraying assembly 600 at said visible distance 208 from said vehicle driver 210. In one embodiment, said spraying assembly 600 can be configured to dispense said plurality of markings 106 at said uniform distance 200 on said road 102.

In one embodiment, said spraying assembly 600 can comprise a wheel assembly 702, a chain assembly 704, a circulating striker assembly 706, a paint bottle 708, and a spraying assembly frame 710. In one embodiment, said spraying assembly frame 710 can be configured to rotateably attach to said frame 700 and selectively rotate about said vertical axis 512. Said wheel assembly 702 can attach to a portion of said spraying assembly frame 710 an support said distal end 206 of said road marker system 100.

Figure 8:
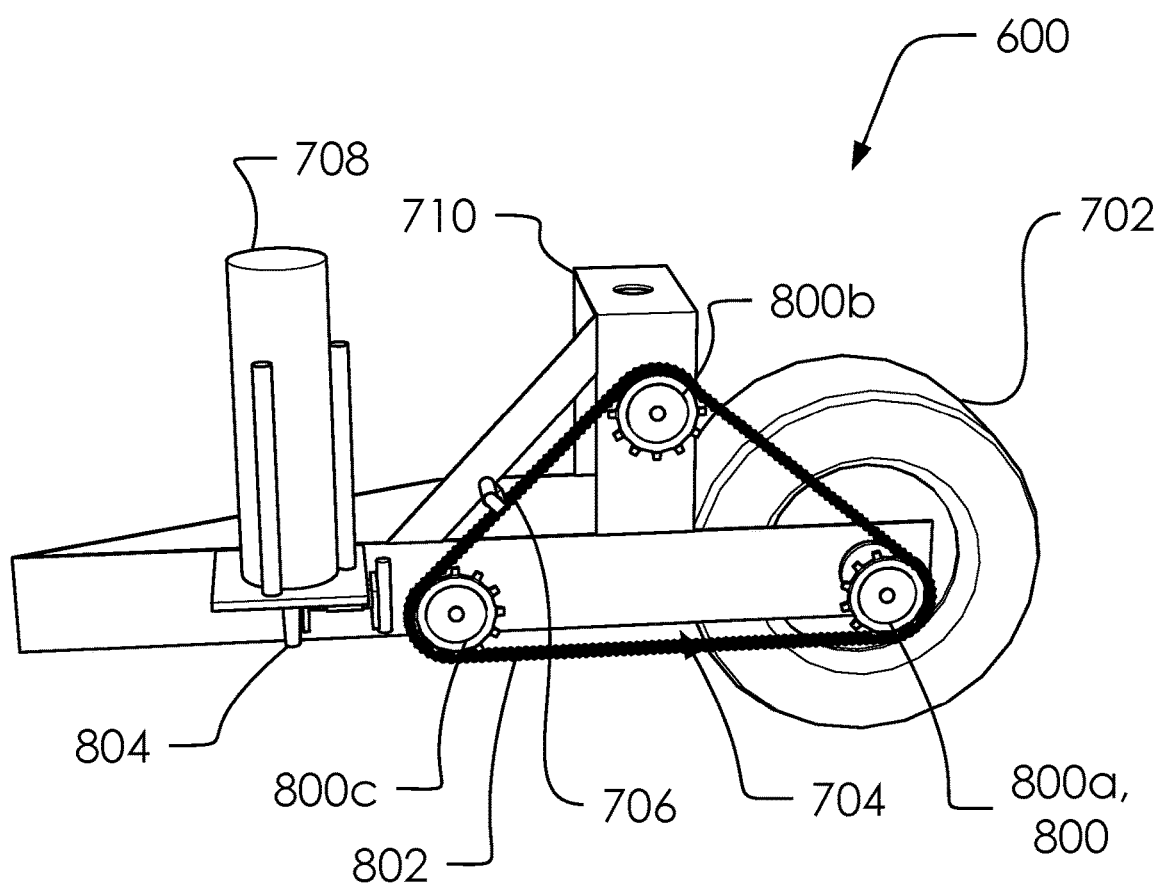
FIG. 8 illustrates a perspective overview of a spraying assembly 600.

FIG. 8 illustrates a perspective overview of said spraying assembly 600.

Said chain assembly 704 can comprise a plurality of sprocket wheels 800 with a chain 802 wrapped circulating around said plurality of sprocket wheels 800. In one embodiment, said circulating striker assembly 706 can be attached to an exterior portion of said chain 802; wherein, said circulating striker assembly 706 can circulate around said chain 802 as said chain 802 circulates around said plurality of sprocket wheels 800. In one embodiment, a valve nozzle release 804 of said paint bottle 708 can be placed in the path of said circulating striker assembly 706 such that, as said circulating striker assembly 706 passes said paint bottle 708, said valve nozzle release 804 is depressed and paint is released from said paint bottle 708. In one embodiment, said paint bottle 708 can be held in a paint cradle configured to invert said paint bottle 708 and point said valve nozzle release 804 at a portion of said road 102. In one embodiment, said road marker system 100 can be configured to dispense a portion of said paint bottle 708 by: driving a first sprocket wheel 800*a* by rolling said wheel assembly 702 on said road 102, spinning said wheel assembly 702, driving said first sprocket wheel 800*a*, circulating said chain 802 around said plurality of sprocket wheels 800, and triggering said valve nozzle release 804 with said circulating striker assembly 706.

In one embodiment, said plurality of sprocket wheels 800 can comprise said first sprocket wheel 800*a*, a second sprocket wheel 800*b* and a third sprocket wheel 800*c*.

In one embodiment, said chain 802 can comprise a chain, a belt, a line, a rope, or any other flexible mechanical item designed to transmit a rotation of said wheel assembly 702 around said plurality of sprocket wheels 800.

Figure 9A:
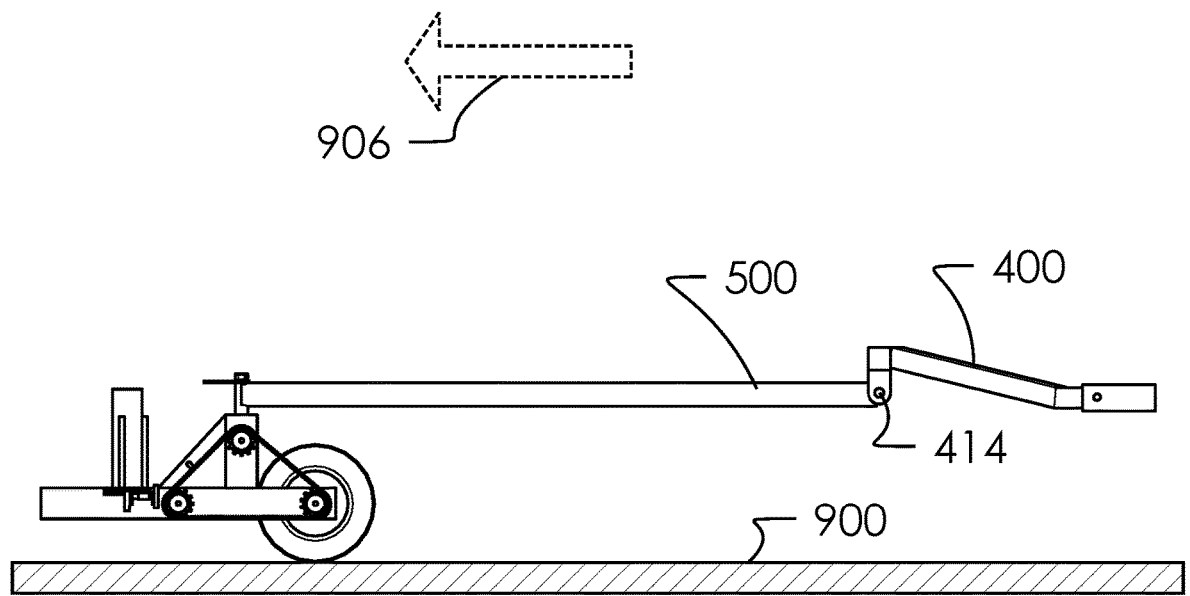
FIGS. 9A and 9B illustrate an elevated side view of said road marker system 100 on a flat ground surface 900 and a bumpy ground surface 902.
Figure 9B:
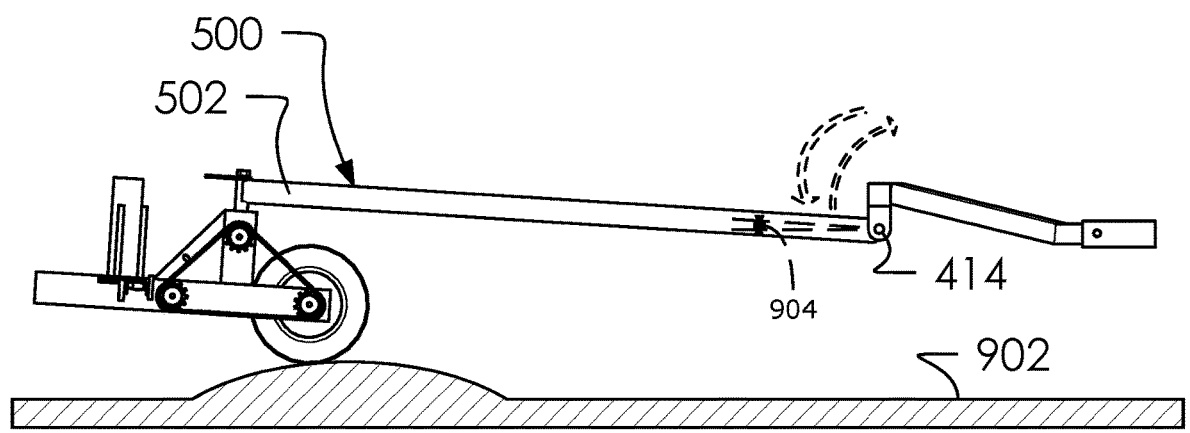

FIGS. 9A and 9B illustrate an elevated side view of said road marker system 100 on a flat ground surface 900 and a bumpy ground surface 902.

Said first rotating axis 414 can be perpendicular to a direction of travel 906 of said spraying assembly 600 and substantially parallel with said flat ground surface 900.

In one embodiment, said road marker system 100 can be configured to adjust to said chain 802 by: rotateably attaching said intermediate bracket assembly 500 to said first bracket assembly 400, allowing said intermediate bracket assembly 500 and said spraying assembly 600 to rotate around said first rotating axis 414, raising and lowering said spraying assembly 600 a rotation angle 904 as it rolls over said bumpy ground surface 902.

Figure 10A:
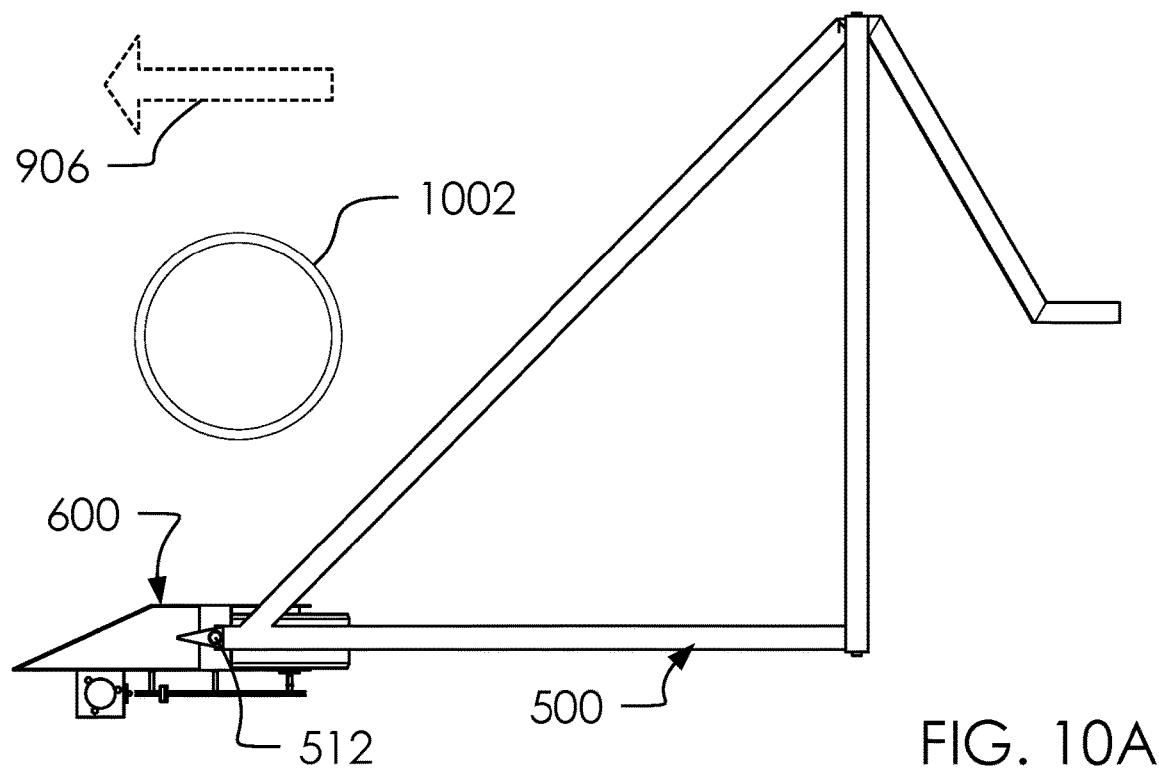
FIGS. 10A and 10B illustrate an elevated top view of said road marker system 100 with said spraying assembly 600 rotating around said vertical axis 512.
Figure 10B:
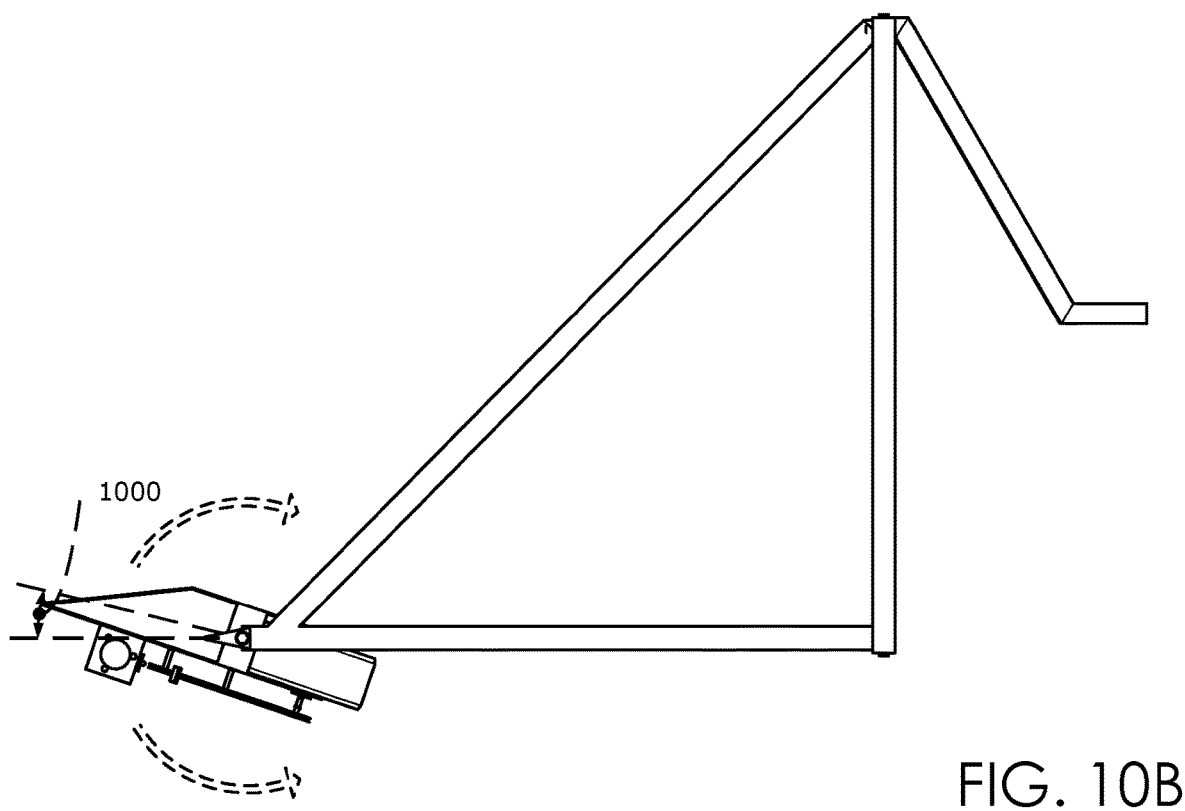

FIGS. 10A and 10B illustrate an elevated top view of said road marker system 100 with said spraying assembly 600 rotating around said vertical axis 512.

One feature of said road marker system 100 can comprise allowing said spraying assembly 600 to rotate left and right relative to said direction of travel 906 at a horizontal rotation angel 1000 by rotateably attaching said spraying assembly 600 to said frame 700 at said vertical axis 512.

In one embodiment, said road marker system 100 can be configured to deflect an obstacle 1002 in said road 102. For example, said obstacle 1002 may comprise a road construction barrel or cone on said shoulder portion 204 of said road 102. Note that said spraying assembly 600 and said frame 700 comprise a triangular shape with a point at a front end of said spraying assembly 600 and with a trailing bar flaring outward perpendicular to said direction of travel 906; wherein, said road marker system 100 can bump into a portion of said obstacle 1002 and push it out of a path in front of said vehicle 104 as it travels forward. For example, said second intermediate bar 504 is configured to press said obstacle 1002 out and around said first end 514 of said second intermediate bar 504.

Figure 11:
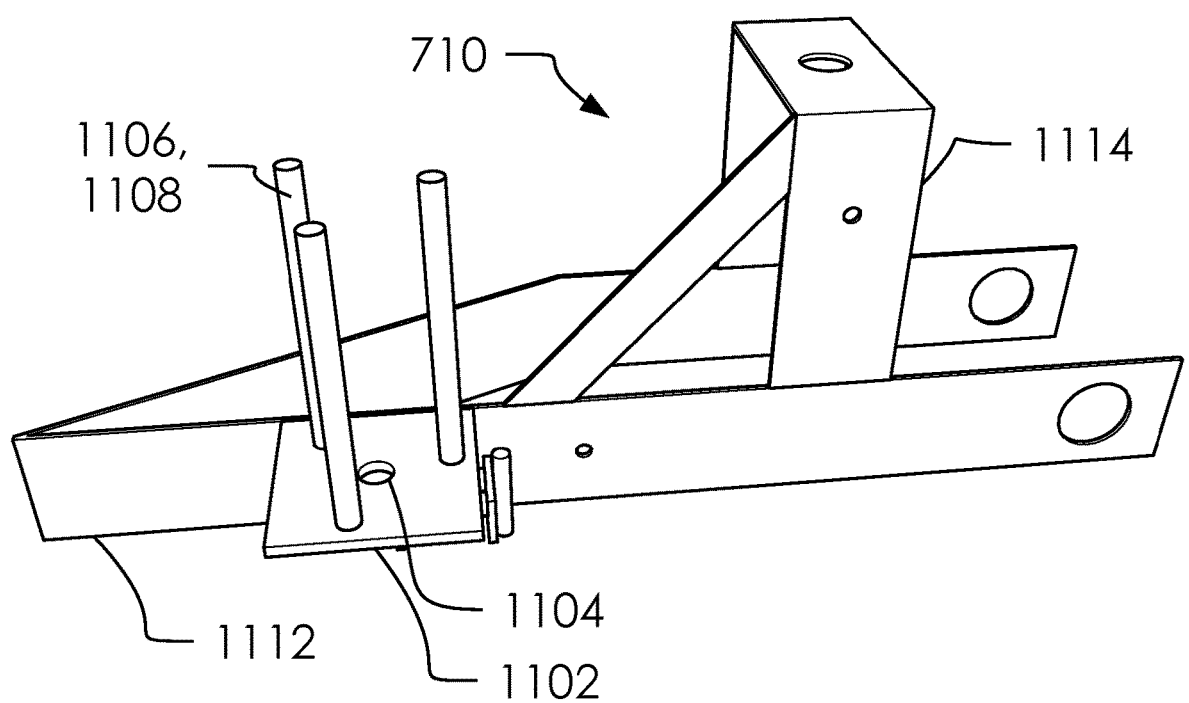
FIG. 11 illustrates a perspective overview of a spraying assembly frame 710 and a paint bottle assembly 1100.

FIG. 11 illustrates a perspective overview of said spraying assembly frame 710 and a paint bottle assembly 1100.

In one embodiment, said spraying assembly frame 710 can comprise said paint bottle assembly 1100. In one embodiment, said paint bottle assembly 1100 can comprise a platform portion 1102 comprising an aperture 1104, and a bottle support 1106.

In one embodiment, said bottle support 1106 can comprise three or more supports 1108 configured around said aperture 1104, as is known in the art.

In one embodiment, said spraying assembly frame 710 can comprise a horizontal portion 1112 and a vertical portion 1114. Said vertical portion 1114 can be configured to rotateably attach to said vertical sleeve 508 of said intermediate bracket assembly 500.

In one embodiment, said horizontal portion 1112 can partially surround and support said wheel assembly 702, as illustrated.

FIGS. 12A, 12B, and 12C illustrate a perspective overview and lower view, and an elevated side view of said paint bottle assembly 1100.

In one embodiment, said valve nozzle release 804 can extend down and through said aperture 1104, and a body portion 1200 of said paint bottle 708 can be supported by said bottle support 1106.

In one embodiment, said paint bottle assembly 1100 can further comprise a valve trigger assembly 1202. Said valve trigger assembly 1202 can comprise a striker portion 1204 and a sleeve portion 1206. In one embodiment, said sleeve portion 1206 can be attached to a bottom surface of said platform portion 1102 of said paint bottle assembly 1100, as illustrated. In one embodiment, said striker portion 1204 can selectively slide within said sleeve portion 1206 toward and away from said aperture 1104. Said striker portion 1204 can comprise a first end 1208 and a second end 1210. Wherein, said first end 1208 can be arranged outside of said platform portion 1102 to interact with said circulating striker assembly 706, and said second end 1210 can be under said platform portion 1102 to interact with said valve nozzle release 804, as discussed below.

Accordingly, said valve trigger assembly 1202 can be configured for: transferring a force from said first end 1208 and said second end 1210 of said striker portion 1204 through said sleeve portion 1206; and pressing into said valve nozzle release 804 with said second end 1210 when said first end 1208 is pressed with said circulating striker assembly 706. Further, because commonly said valve nozzle release 804 is spring loaded, said second end 1210 will return to a starting position when said circulating striker assembly 706 is removed.

In one embodiment, said first end 1208 can comprise a vertical and cylindrical shape and can be installed in the path of said circulating striker assembly 706 such that it can receive force from said circulating striker assembly 706 whether circulating in a clockwise or counterclockwise direction on said chain 802.

Figure 13A:
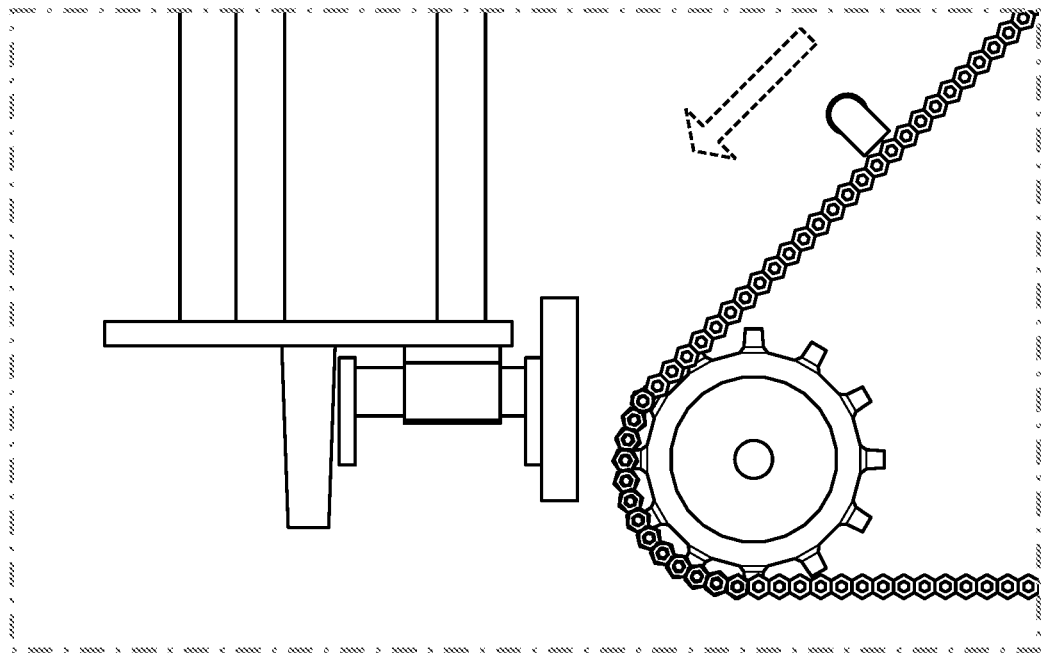
FIGS. 13A and 13B illustrate said spraying assembly 600 with a circulating striker assembly 706 in a non-striking and striking configuration as it circulates around a chain 802.
Figure 13B:
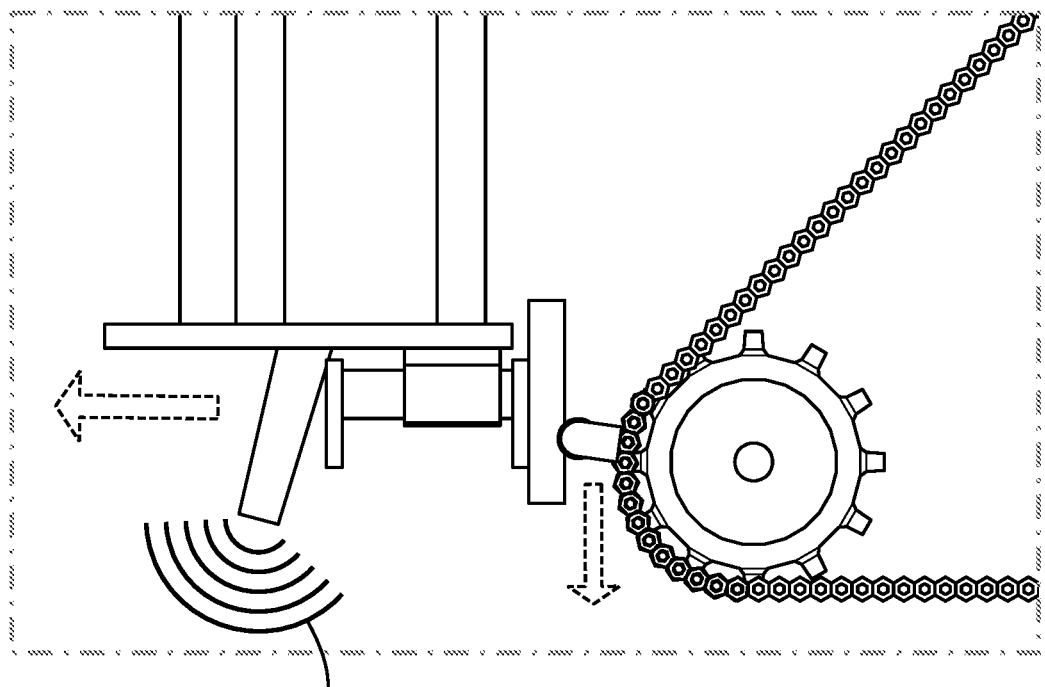

FIGS. 13A and 13B illustrate said spraying assembly 600 with said circulating striker assembly 706 in a non-striking and striking configuration as it circulates around said chain 802.

In one embodiment, as said circulating striker assembly 706 circulates around said chain 802, it can be configured for: selectively depressing said first end 1208 of said striker portion 1204, opening said valve nozzle release 804 by pressing said second end 1210 of said striker portion 1204 into said valve nozzle release 804, and spraying a paint mist 1300 from said valve nozzle release 804 to create one among said plurality of markings 106 on said road 102.

Figure 14:
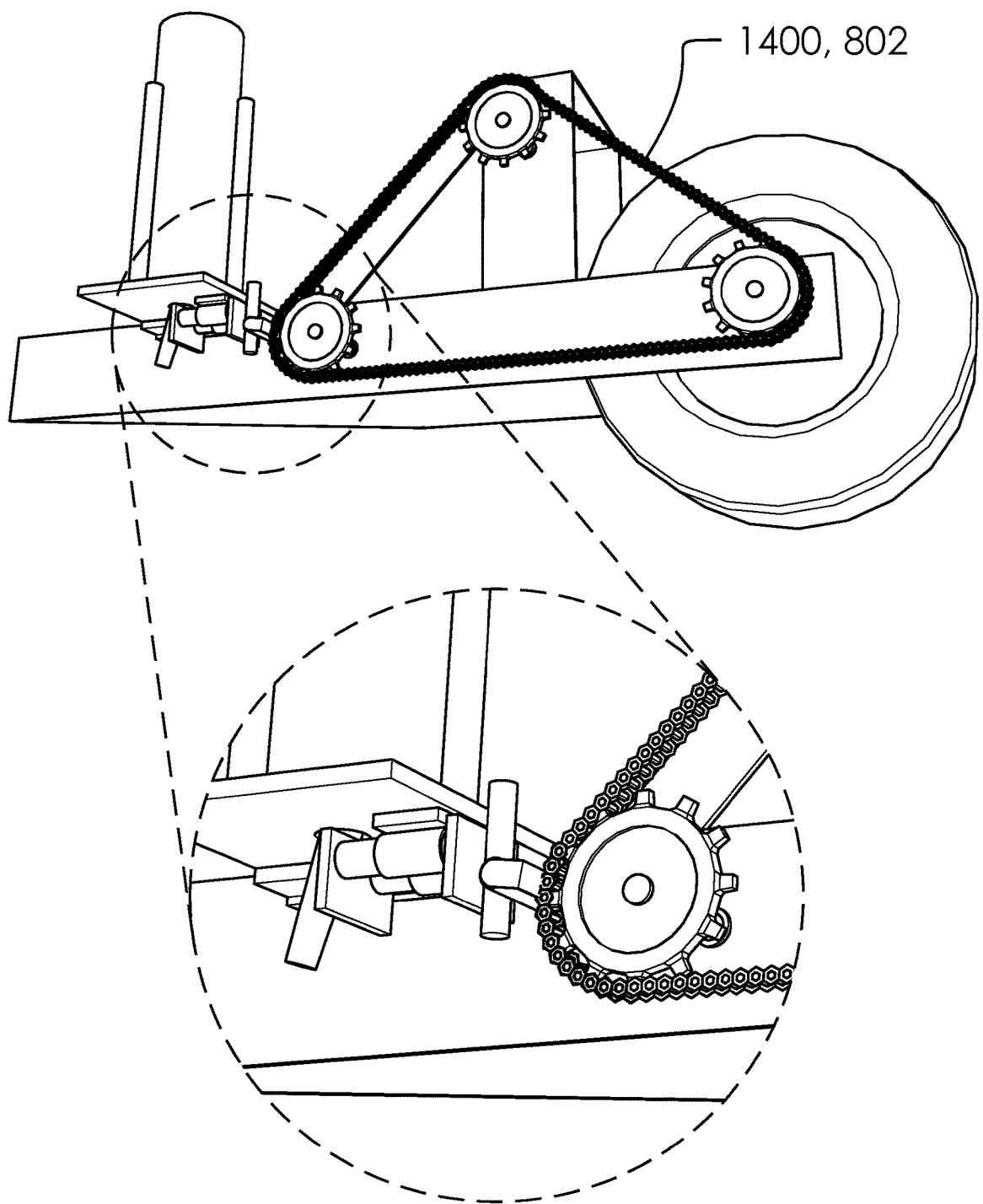
FIG. 14 illustrates a perspective lower view of said spraying assembly 600 and detailed view of said circulating striker assembly 706 striking a valve nozzle release 804.

FIG. 14 illustrates a perspective lower view of said spraying assembly 600 and detailed view of said circulating striker assembly 706 striking said valve nozzle release 804.

In one embodiment, said circulating striker assembly 706 can cause said plurality of markings 106 to be dispensed at said uniform distance 200, where said uniform distance 200 is equal to a circumference 1400 of said chain 802. In another embodiment, said uniform distance 200 can be dissimilar to said circumference 1400 of said chain 802 where a gearing is employed to slow or speed the movement of said circulating striker assembly 706 around said chain 802.

Figure 15:
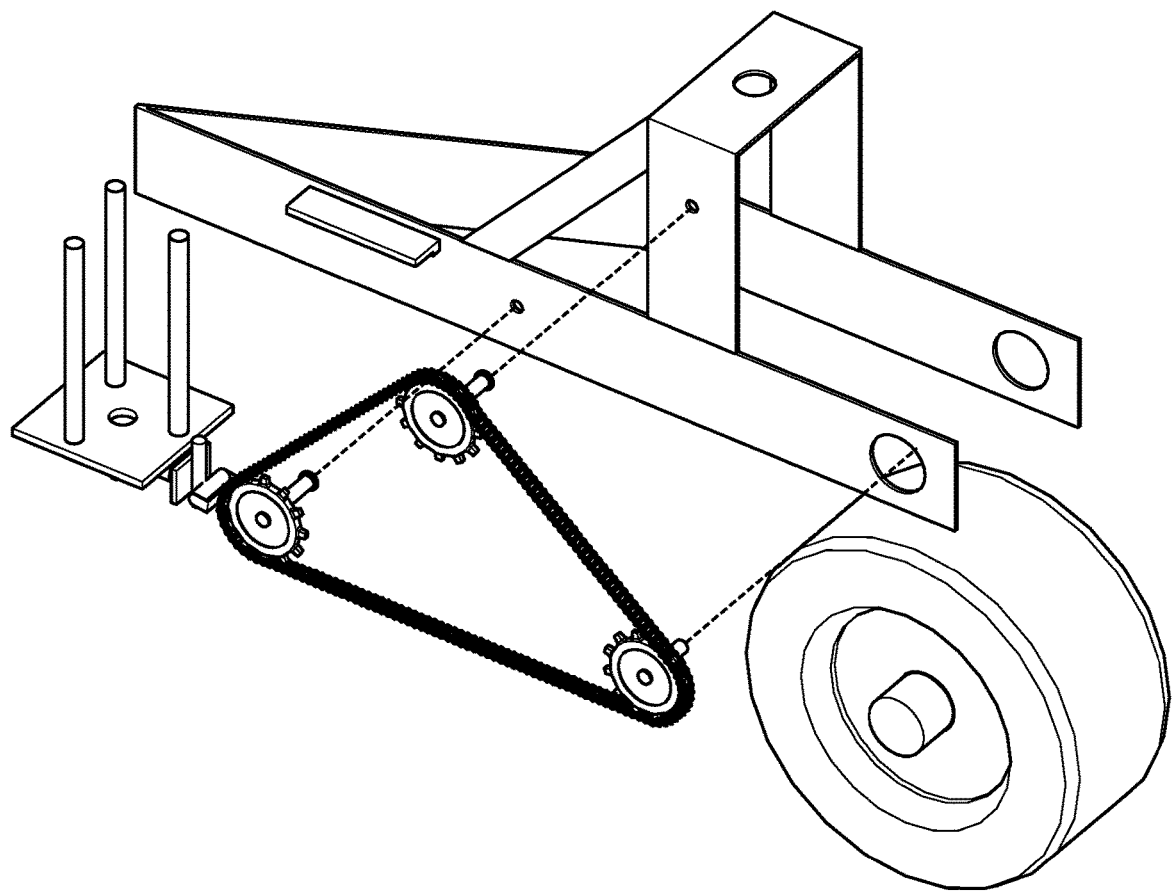
FIG. 15 illustrates an exploded perspective overview of said road marker system 100.

FIG. 15 illustrates an exploded perspective overview of said road marker system 100.

The following sentences comprise a preferred embodiment of the application:

Said road marker system 100 for dispensing said plurality of markings 106 at said uniform distance 200 on said road 102. wherein said road marker system 100 comprises said frame 700. wherein, said frame 700 can be configured to attach said spraying assembly 600 to said vehicle 104 and position said spraying assembly 600 at said visible distance 208 from said vehicle driver 210. Said chain assembly 704 comprises said plurality of sprocket wheels 800 with said chain 802 wrapped circulating around said plurality of sprocket wheels 800. Said circulating striker assembly 706 can be attached to an exterior portion of said chain 802. wherein, said circulating striker assembly 706 can be configured to circulate around said chain 802 as said chain 802 circulates around said plurality of sprocket wheels 800. Said road marker system 100 further comprises said valve nozzle release 804 having said paint bottle 708. Said paint bottle 708 of said valve nozzle release 804 can be placed in the path of said circulating striker assembly 706 such that, as said circulating striker assembly 706 passes said paint bottle 708, said valve nozzle release 804 can be depressed and paint can be released from said paint bottle 708. Said paint bottle 708 can be held in said paint bottle assembly 1100 inverted with said valve nozzle release 804 pointed at a portion of said road 102. Said road marker system 100 can be configured to dispense a portion of said paint bottle 708 by: driving said first sprocket wheel 800a by rolling said wheel assembly 702 on said road 102, spinning said wheel assembly 702, driving said first sprocket wheel 800a, circulating said chain 802 around said plurality of sprocket wheels 800, and triggering said valve nozzle release 804 with said circulating striker assembly 706.

Said road marker system 100 for dispensing said plurality of markings 106 at said uniform distance 200 on said road 102. wherein said road marker system 100 comprises said frame 700, and said spraying assembly 600. Said spraying assembly 600 comprises said chain assembly 704, and said paint bottle 708. Said chain assembly 704 can be configured to circulate and trigger said paint bottle 708 to dispense paint at said uniform distance 200. wherein, said frame 700 can be configured to attach said spraying assembly 600 to said vehicle 104 and position said spraying assembly 600 at said visible distance 208 from said vehicle driver 210.

Said frame 700 comprises said first bracket assembly 400 and said intermediate bracket assembly 500.

Said road marker system 100 can be configured to adjust to said bumpy ground surface 902 by: rotateably attaching said intermediate bracket assembly 500 to said first bracket assembly 400, allowing said intermediate bracket assembly 500 and said spraying assembly 600 to rotate around said first rotating axis 414, and raising and lowering said spraying assembly 600 said rotation angle 904 as it rolls over said bumpy ground surface 902.

Said first rotating axis 414 can be perpendicular to said direction of travel 906 of said spraying assembly 600 and substantially parallel with said flat ground surface 900.

Said chain assembly 704 comprises said plurality of sprocket wheels 800 with said chain 802 wrapped circulating around said plurality of sprocket wheels 800. Said circulating striker assembly 706 can be attached to an exterior portion of said chain 802. wherein, said circulating striker assembly 706 can be configured to circulate around said chain 802 as said chain 802 circulates around said plurality of sprocket wheels 800. Said road marker system 100 further comprises said valve nozzle release 804 having said paint bottle 708. Said paint bottle 708 of said valve nozzle release 804 can be placed in the path of said circulating striker assembly 706 such that, as said circulating striker assembly 706 passes said paint bottle 708, said valve nozzle release 804 can be depressed and paint can be released from said paint bottle 708. Said paint bottle 708 can be held in said paint bottle assembly 1100 inverted with said valve nozzle release 804 pointed at a portion of said road 102. Said road marker system 100 can be configured to dispense a portion of said paint bottle 708 by: driving said first sprocket wheel 800a by rolling said wheel assembly 702 on said road 102, spinning said wheel assembly 702, driving said first sprocket wheel 800a, circulating said chain 802 around said plurality of sprocket wheels 800, and triggering said valve nozzle release 804 with said circulating striker assembly 706.

Said plurality of sprocket wheels 800 comprises said first sprocket wheel 800a, said second sprocket wheel 800b and said third sprocket wheel 800c.

Said road marker system 100 can be configured for allowing said spraying assembly 600 to rotate left and right relative to said direction of travel 906 by rotateably attaching said spraying assembly 600 to said frame 700 at said vertical axis 512.

Said spraying assembly frame 710 comprises said paint bottle assembly 1100. Said paint bottle assembly 1100 comprises said platform portion 1102 comprising said aperture 1104, and said bottle support 1106. Said bottle support 1106 comprises said three or more supports 1108 configured around said aperture 1104, as can be known in the art. Said valve nozzle release 804 can be configured to extend down and through said aperture 1104, and said body portion 1200 of said paint bottle 708 can be supported by said bottle support 1106.

Said chain assembly 704 comprises said plurality of sprocket wheels 800 with said chain 802 wrapped circulating around said plurality of sprocket wheels 800. Said circulating striker assembly 706 can be attached to an exterior portion of said chain 802. wherein, said circulating striker assembly 706 can be configured to circulate around said chain 802 as said chain 802 circulates around said plurality of sprocket wheels 800. Said road marker system 100 further comprises said valve nozzle release 804 having said paint bottle 708. Said paint bottle 708 of said valve nozzle release 804 can be placed in the path of said circulating striker assembly 706 such that, as said circulating striker assembly 706 passes said paint bottle 708, said valve nozzle release 804 can be depressed and paint can be released from said paint bottle 708. Said paint bottle 708 can be held in said paint bottle assembly 1100 inverted with said valve nozzle release 804 pointed at a portion of said road 102. Said road marker system 100 can be configured to dispense a portion of said paint bottle 708 by: driving said first sprocket wheel 800a by rolling said wheel assembly 702 on said road 102, spinning said wheel assembly 702, driving said first sprocket wheel 800a, circulating said chain 802 around said plurality of sprocket wheels 800, and triggering said valve nozzle release 804 with said circulating striker assembly 706.

Said circulating striker assembly 706 can be configured to cause said plurality of markings 106 to be dispensed at said uniform distance 200, where said uniform distance 200 can be equal to a circumference of said chain 802.

Said uniform distance 200 can be dissimilar to said circumference of said chain 802 where a gearing can be employed to slow or speed the movement of said circulating striker assembly 706 around said chain 802.

Said first bracket assembly 400 comprises said receiver connector bar 402 and said cross bar 404. Said receiver connector bar 402 can be configured to selectively attach to said hitch receiver 300. Said cross bar 404 can be configured to attach to said receiver connector bar 402. Said cross bar 404 can be configured to stretch across a front portion of said vehicle 104 being substantially parallel with a front bumper of said vehicle 104. Said cross bar 404 comprises said first end 406a and said second end 406b. Said first bracket assembly 400 comprises said one or more hinge assemblies 408. Said one or more hinge assemblies 408 comprises said first hinge assembly 408a, and said second hinge assembly 408b. each among said one or more hinge assemblies 408 comprises said two side plates 410, and said hinge bar 412 aligned with said first rotating axis 414.

Said intermediate bracket assembly 500 comprises said first intermediate bar 502, said second intermediate bar 504, said pointer 506, said vertical sleeve 508, and said vertical fastener 510. Said vertical sleeve 508 comprises said vertical axis 512. each among said first intermediate bar 502 and said second intermediate bar 504, comprises said first end 514 and said second end 516. Said first end 514 of each said first intermediate bar 502 and said second intermediate bar 504 can be configured to rotateably attach to said one or more hinge assemblies 408 and rotate around said first rotating axis 414. Said intermediate bracket assembly 500 comprises a triangle formed by said first intermediate bar 502, said second intermediate bar 504 and said first bracket assembly 400. Said second end 516 of said first intermediate bar 502 and said second intermediate bar 504 can be attached to one another. Said pointer 506 and said vertical sleeve 508 can be substantially aligned with said first intermediate bar 502. Said vertical sleeve 508 can be attached to said second end 516 of said first intermediate bar 502.

Said road marker system 100 can be configured to deflect said obstacle 1002 in said road 102. Said spraying assembly 600 and said frame 700 comprise a triangular shape with a point at a front end of said spraying assembly 600 and with a trailing bar flaring outward perpendicular to said direction of travel 906. Said road marker system 100 can be configured to bump into a portion of said obstacle 1002 and push it out of a path in front of said vehicle 104 as it travels forward. Said second intermediate bar 504 can be configured to press said obstacle 1002 out and around said first end 514 of said second intermediate bar 504.

Said road marker system 100 for dispensing said plurality of markings 106 at said uniform distance 200 on said road 102. wherein said road marker system 100 comprises said frame 700, and said spraying assembly 600. Said spraying assembly 600 comprises said chain assembly 704, and said paint bottle 708. Said chain assembly 704 can be configured to circulate and trigger said paint bottle 708 to dispense paint at said uniform distance 200. wherein, said frame 700 can be configured to attach said spraying assembly 600 to said vehicle 104 and position said spraying assembly 600 at said visible distance 208 from said vehicle driver 210. Said road marker system 100 can be configured for allowing said spraying assembly 600 to rotate left and right relative to said direction of travel 906 by rotateably attaching said spraying assembly 600 to said frame 700 at said vertical axis 512.

Said circulating striker assembly 706 can be configured to cause said plurality of markings 106 to be dispensed at said uniform distance 200, where said uniform distance 200 can be equal to a circumference of said chain 802.

Said uniform distance 200 can be dissimilar to said circumference of said chain 802 where a gearing can be employed to slow or speed the movement of said circulating striker assembly 706 around said chain 802.

Said road marker system 100 can be configured to deflect said obstacle 1002 in said road 102. Said spraying assembly 600 and said frame 700 comprise a triangular shape with a point at a front end of said spraying assembly 600 and with a trailing bar flaring outward perpendicular to said direction of travel 906. Said road marker system 100 can be configured to bump into a portion of said obstacle 1002 and push it out of a path in front of said vehicle 104 as it travels forward. Said second intermediate bar 504 can be configured to press said obstacle 1002 out and around said first end 514 of said second intermediate bar 504.

The following summary of the parts in the figures is included for the convenience of the reader:
said road marker system 100,
said road 102,
said vehicle 104,
said plurality of markings 106,
said uniform distance 200,
said first marker 202a,
said second marker 202b,
said shoulder portion 204,
said distal end 206,
said visible distance 208,
said vehicle driver 210,
said hitch receiver 300,
said first bracket assembly 400,
said receiver connector bar 402,
said cross bar 404,
said first end 406a,
said second end 406b,
said one or more hinge assemblies 408,
said first hinge assembly 408a,
said second hinge assembly 408b,
said two side plates 410,
said hinge bar 412,
said first rotating axis 414,
said intermediate bracket assembly 500,
said first intermediate bar 502,
said second intermediate bar 504,
said pointer 506,
said vertical sleeve 508,
said vertical fastener 510,
said vertical axis 512,
said first end 514,
said second end 516,
said spraying assembly 600,
said frame 700,
said wheel assembly 702, said chain assembly 704,
said circulating striker assembly 706,
said paint bottle 708,
said spraying assembly frame 710,
said plurality of sprocket wheels 800,
said first sprocket wheel 800a,
said second sprocket wheel 800b,
said third sprocket wheel 800c,
said chain 802,
said valve nozzle release 804,
said flat ground surface 900,
said bumpy ground surface 902,
said rotation angle 904,
said direction of travel 906,
said horizontal rotation angel 1000,
said obstacle 1002,
said paint bottle assembly 1100,
said platform portion 1102,
said aperture 1104,
said bottle support 1106,
said three or more supports 1108,
said horizontal portion 1112,
said vertical portion 1114,
said body portion 1200,
said valve trigger assembly 1202,
said striker portion 1204,
said sleeve portion 1206,
said first end 1208,
said second end 1210,
said paint mist 1300 and
said circumference 1400.

Various changes in the details of the illustrated operational methods are possible without departing from the scope of the following claims. Some embodiments may combine the activities described herein as being separate steps. Similarly, one or more of the described steps may be omitted, depending upon the specific operational environment the method is being implemented in. It is to be understood that the above description is intended to be illustrative, and not restrictive. For example, the above-described embodiments may be used in combination with each other. Many other embodiments will be apparent to those of skill in the art upon reviewing the above description. The scope of the invention should, therefore, be determined with reference to the appended claims, along with the full scope of equivalents to which such claims are entitled. In the appended claims, the terms "including" and "in which" are used as the plain-English equivalents of the respective terms "comprising" and "wherein."

The invention claimed is:

1. A road marker system for dispensing a plurality of markings at a uniform distance on a road; wherein
said road marker system comprises a frame, and a spraying assembly;
said spraying assembly comprises a chain assembly, and a paint bottle;
said paint bottle contains a paint;
said chain assembly is configured to circulate and trigger said paint bottle to dispense said paint at said uniform distance; and
wherein, said frame is configured to attach said spraying assembly to a vehicle and position said spraying assembly at a visible distance from a vehicle driver;
a first bracket assembly comprises a receiver connector bar and a cross bar;
said receiver connector bar is configured to selectively attach to a hitch receiver;
said cross bar is configured to attach to said receiver connector bar;
said cross bar is configured to stretch across a front portion of said vehicle being substantially parallel with a front bumper of said vehicle;
said cross bar comprises a first end and a second end;
said first bracket assembly comprises one or more hinge assemblies;
said one or more hinge assemblies comprises a first hinge assembly, and a second hinge assembly; and
each among said one or more hinge assemblies comprises two side plates, and a hinge bar aligned with said first rotating axis.

2. The road marker system of claim 1, wherein:
said frame comprises a first bracket assembly and an intermediate bracket assembly.

3. The road marker system of claim 2, wherein:
said road marker system is configured to adjust to a bumpy ground surface by:
rotatably attaching said intermediate bracket assembly to said first bracket assembly,
allowing said intermediate bracket assembly and said spraying assembly to rotate around a first rotating axis, and
raising and lowering said spraying assembly a rotation angle as it rolls over said bumpy ground surface.

4. The road marker system of claim 3, wherein:
said first rotating axis is perpendicular to a direction of travel of said spraying assembly and substantially parallel with a flat ground surface.

5. The road marker system of claim 1, wherein:
said chain assembly comprises a plurality of sprocket wheels with a chain wrapped circulating around said plurality of sprocket wheels;
a circulating striker assembly is attached to an exterior portion of said chain;
wherein, said circulating striker assembly is configured to circulate around said chain as said chain circulates around said plurality of sprocket wheels;
said road marker system further comprises a valve nozzle release having said paint bottle;
said paint bottle of said valve nozzle release is placed in the path of said circulating striker assembly such that, as said circulating striker assembly passes said paint bottle, said valve nozzle release is depressed and paint is released from said paint bottle;
said paint bottle is held in a paint bottle assembly inverted with said valve nozzle release pointed at a portion of said road;
said road marker system is configured to dispense a portion of said paint in said paint bottle by:
driving a first sprocket wheel by rolling a wheel assembly on said road, spinning said wheel assembly, driving said first sprocket wheel,
circulating said chain around said plurality of sprocket wheels, and
triggering said valve nozzle release with said circulating striker assembly.

6. The road marker system of claim 5, wherein:
said plurality of sprocket wheels comprises said first sprocket wheel, a second sprocket wheel and a third sprocket wheel.

7. The road marker system of claim 1, wherein:
said road marker system is configured for allowing said spraying assembly to rotate left and right relative to a direction of travel by rotatably attaching said spraying assembly to said frame at a vertical axis.

8. The road marker system of claim 1, wherein:
a spraying assembly frame comprises said paint bottle assembly;
said paint bottle assembly comprises a platform portion comprising an aperture, and a bottle support;
said bottle support comprises three or more supports configured around said aperture, as is known in the art; and
said valve nozzle release is configured to extend down and through said aperture, and a body portion of said paint bottle is supported by said bottle support.

9. The road marker system of claim 8, wherein:
said chain assembly comprises said plurality of sprocket wheels with said chain wrapped circulating around said plurality of sprocket wheels;
a said circulating striker assembly is attached to an exterior portion of said chain;
wherein, said circulating striker assembly is configured to circulate around said chain as said chain circulates around said plurality of sprocket wheels;
said road marker system further comprises said valve nozzle release having said paint bottle;
said paint bottle of said valve nozzle release is placed in the path of said circulating striker assembly such that, as said circulating striker assembly passes said paint bottle, said valve nozzle release is depressed and paint is released from said paint bottle;
said paint bottle is held in said paint bottle assembly inverted with said valve nozzle release pointed at a portion of said road;
said road marker system is configured to dispense a portion of said paint in said paint bottle by:
    driving said first sprocket wheel by rolling said wheel assembly on said road, spinning said wheel assembly,
    driving said first sprocket wheel,
    circulating said chain around said plurality of sprocket wheels, and
    triggering said valve nozzle release with said circulating striker assembly.

10. The road marker system of claim 1, wherein:
a circulating striker assembly is configured to cause said plurality of markings to be dispensed at said uniform distance, where said uniform distance is equal to a circumference of said chain.

11. The road marker system of claim 1, wherein:
said uniform distance is dissimilar to said circumference of said chain where a gearing is employed to slow or speed the movement of a circulating striker assembly around said chain.

12. The road marker system of claim 1, wherein:
an intermediate bracket assembly comprises a first intermediate bar, a second intermediate bar, a pointer, a vertical sleeve, and a vertical fastener;
said vertical sleeve comprises said vertical axis;
each among said first intermediate bar and said second intermediate bar, comprises a first end and a second end;
said first end of each said first intermediate bar and said second intermediate bar is configured to rotatably attach to said one or more hinge assemblies and rotate around said first rotating axis;
said intermediate bracket assembly comprises a triangle formed by said first intermediate bar, said second intermediate bar and a first bracket assembly;
said second end of said first intermediate bar and said second intermediate bar is attached to one another;
said pointer and said vertical sleeve is substantially aligned with said first intermediate bar; and
said vertical sleeve is attached to said second end of said first intermediate bar.

13. The road marker system of claim 12, wherein:
said circulating striker assembly is configured to cause said plurality of markings to be dispensed at said uniform distance, where said uniform distance is equal to a circumference of said chain.

14. The road marker system of claim 12, wherein:
said uniform distance is dissimilar to said circumference of said chain where a gearing is employed to slow or speed the movement of said circulating striker assembly around said chain.

15. The road marker system of claim 12, wherein:
said road marker system is configured to deflect an obstacle in said road;
said spraying assembly and said frame comprise a triangular shape with a point at a front end of said spraying assembly and with a trailing bar flaring outward perpendicular to said direction of travel;
said road marker system is configured to bump into a portion of said obstacle and push it out of a path in front of said vehicle as it travels forward; and
said second intermediate bar is configured to press said obstacle out and around said first end of said second intermediate bar.

16. The road marker system of claim 1, wherein:
said road marker system is configured to deflect an obstacle in said road;
said spraying assembly and said frame comprise a triangular shape with a point at a front end of said spraying assembly and with a trailing bar flaring outward perpendicular to a direction of travel;
said road marker system is configured to bump into a portion of said obstacle and push it out of a path in front of said vehicle as it travels forward; and
said second intermediate bar is configured to press said obstacle out and around said first end of said second intermediate bar.

17. A road marker system for dispensing a plurality of markings at a uniform distance on a road; wherein
said road marker system comprises a frame, and a spraying assembly;
said spraying assembly comprises a chain assembly, and a paint bottle;
said paint bottle contains a paint;
said chain assembly is configured to circulate and trigger said paint bottle to dispense said paint at said uniform distance; and
wherein, said frame is configured to attach said spraying assembly to a vehicle and position said spraying assembly at a visible distance from a vehicle driver;
an intermediate bracket assembly comprises a first intermediate bar, a second intermediate bar, a pointer, a vertical sleeve, and a vertical fastener;
said vertical sleeve comprises said vertical axis;
each among said first intermediate bar and said second intermediate bar, comprises a first end and a second end;
said first end of each said first intermediate bar and said second intermediate bar is configured to rotatably attach to said one or more hinge assemblies and rotate around said first rotating axis;
said intermediate bracket assembly comprises a triangle formed by said first intermediate bar, said second intermediate bar and a first bracket assembly;

said second end of said first intermediate bar and said second intermediate bar is attached to one another;

said pointer and said vertical sleeve is substantially aligned with said first intermediate bar; and said vertical sleeve is attached to said second end of said first intermediate bar.

18. The road marker system of claim 17, wherein:

said circulating striker assembly is configured to cause said plurality of markings to be dispensed at said uniform distance, where said uniform distance is equal to a circumference of said chain.

19. The road marker system of claim 17, wherein:

said uniform distance is dissimilar to said circumference of said chain where a gearing is employed to slow or speed the movement of said circulating striker assembly around said chain.

20. The road marker system of claim 17, wherein:

said road marker system is configured to deflect an obstacle in said road;

said spraying assembly and said frame comprise a triangular shape with a point at a front end of said spraying assembly and with a trailing bar flaring outward perpendicular to said direction of travel;

said road marker system is configured to bump into a portion of said obstacle and push it out of a path in front of said vehicle as it travels forward; and said second intermediate bar is configured to press said obstacle out and around said first end of said second intermediate bar.

21. A road marker system for dispensing a plurality of markings at a uniform distance on a road; wherein said road marker system comprises a frame, and a spraying assembly;

said spraying assembly comprises a chain assembly, and a paint bottle;

said paint bottle contains a paint;

said chain assembly is configured to circulate and trigger said paint bottle to dispense said paint at said uniform distance; and wherein, said frame is configured to attach said spraying assembly to a vehicle and position said spraying assembly at a visible distance from a vehicle driver;

said road marker system is configured to deflect an obstacle in said road;

said spraying assembly and said frame comprise a triangular shape with a point at a front end of said spraying assembly and with a trailing bar flaring outward perpendicular to a direction of travel;

said road marker system is configured to bump into a portion of said obstacle and push it out of a path in front of said vehicle as it travels forward; and said second intermediate bar is configured to press said obstacle out and around said first end of said second intermediate bar.

* * * * *